Sept. 1, 1970  A. J. MULLER  3,526,413
INSTALLATION FOR THE ADJUSTMENT OF THE CAMBER AND OF
THE CASTER OF VEHICLE WHEELS
Filed Feb. 14, 1968  2 Sheets-Sheet 2
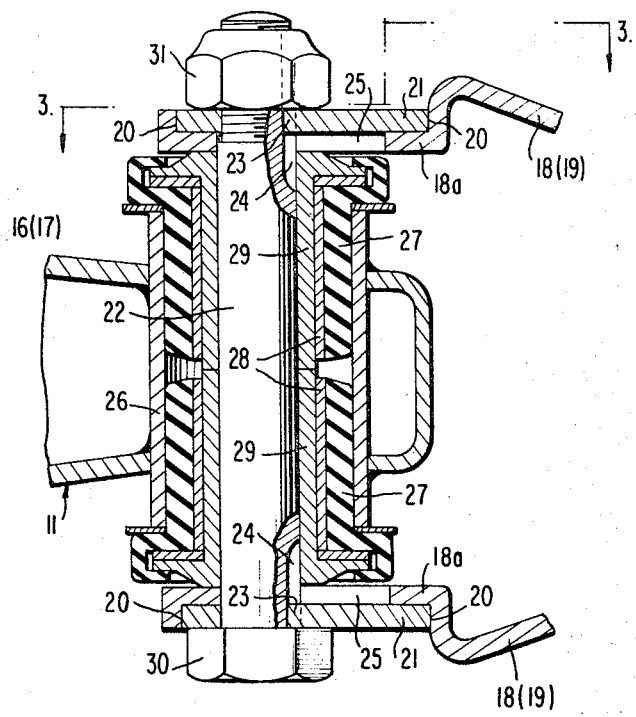
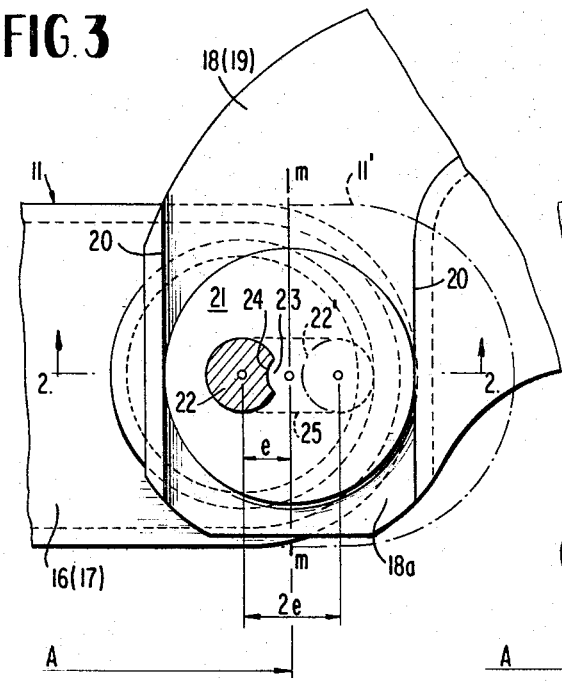
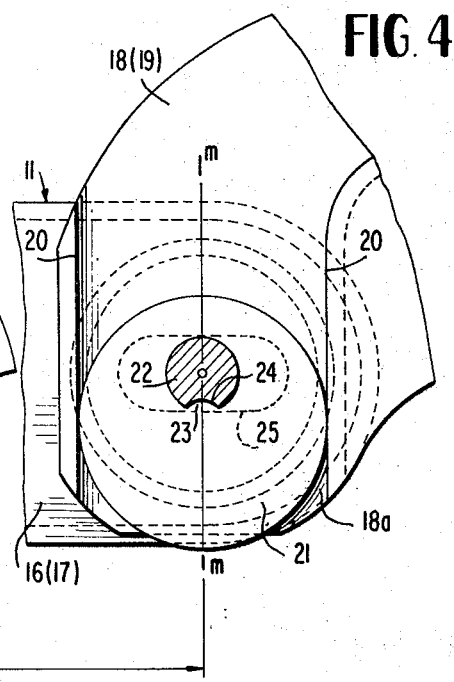
INVENTOR
ALF JOHN MUELLER
BY *Craig & Antonelli*
ATTORNEYS

# United States Patent Office 3,526,413
Patented Sept. 1, 1970

3,526,413
INSTALLATION FOR THE ADJUSTMENT OF THE CAMBER AND OF THE CASTER OF VEHICLE WHEELS
Alf John Muller, Stuttgart-Bad Cannstatt, Germany, assignor to Daimler-Benz Aktiengesellschaft, Stuttgart-Unterturkheim, Germany
Filed Feb. 14, 1968, Ser. No. 705,388
Claims priority, application Germany, Feb. 14, 1967, D 52,271
Int. Cl. B62d 17/00
U.S. Cl. 280—96.2
37 Claims

ABSTRACT OF THE DISCLOSURE

An installation for the adjustment of the camber and/or of the caster of wheels suspended at the vehicle superstructure by means of guide members by the use of eccentric elements arranged in the joints of the guide members, whereby one fork arm of a guide member is supported at the vehicle superstructure at least approximately in a vehicle transverse plane containing the wheel center while the other fork arm is supported in a plane displaced with respect thereto in the vehicle longitudinal direction, and preferably located closer to the wheel plane; both fork arms are also supported independently from each other by means of the adjustable eccentric elements.

BACKGROUND OF THE INVENTION

Figure 1:
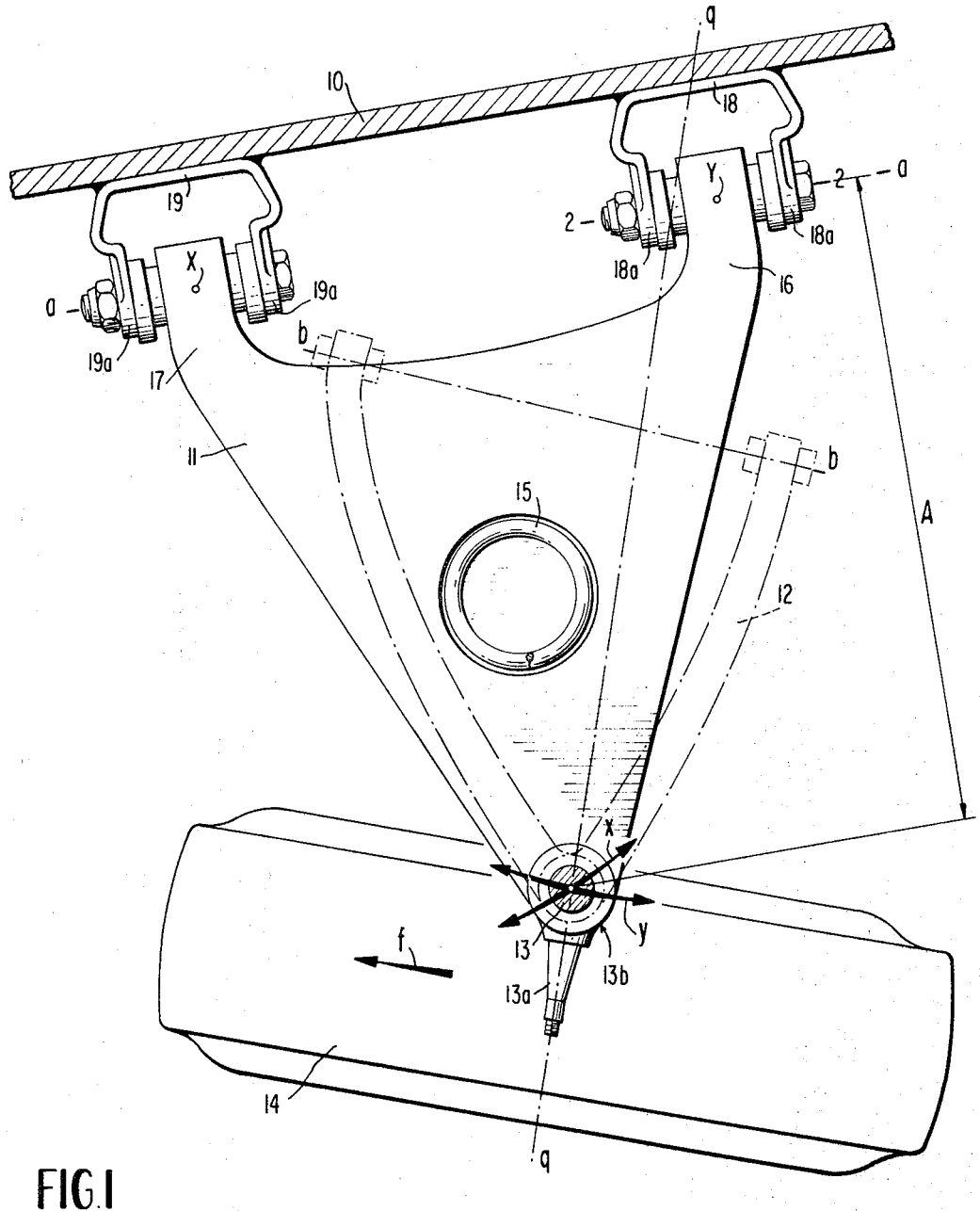

The present invention relates to an installation for the adjustment of the camber and of the caster of wheels suspended by means of guide members, especially of steerable front wheels, which are suspended at the vehicle superstructure by means of two superposed guide members, by the use of eccentric elements arranged in the joints of the guide members. Such types of eccentric adjusting devices are known, per se, in the prior art. By reason of the necessary fitting operations, these prior art installations are relatively costly and under certain circumstances also relatively sensitive with respect to assembly inaccuracies and wear. Furthermore, the adjustment is oftentimes complicated and time-consuming.

SUMMARY OF THE INVENTION

The present invention aims above all at such an installation which excels by simplicity in the construction and adjustment, and which provides in particular the possibility to adjust with similar adjusting installations both the camber as well as the caster.

Accordingly, the present invention essentially consists in that with a fork-like construction of the guide members, one of the two fork arms is supported at the vehicle superstructure in or near the vehicle transverse plane containing the wheel center axis and the other fork arm is supported at the vehicle superstructure in a plane displaced with respect thereto in the vehicle longitudinal direction, and preferably in greater proximity to the wheel plane, and more particularly in that both fork arms are supported at the vehicle superstructure independently of one another by means of adjustable eccentric elements. With the adjustment of the one eccentric element the guide member can be pivoted thereby about the other eccentric element. It is possible thereby to adjust the camber of the wheel by the adjustment of the eccentric element, which connects the fork arm arranged approximately in the aforementioned vehicle transverse plane with the vehicle superstructure, and to adjust the caster of the wheel by the adjustment of the other eccentric element. This is possible because with the first-mentioned adjustment, the joint connecting the guide member with the wheel carrier, carries out a movement at least with a partial component in the vehicle transverse direction whereas with the adjustment of the other eccentric element, the mentioned joint carries out a movement primarily in the vehicle longitudinal direction and therewith changes the inclination of the wheel carrier in a vertical vehicle longitudinal plane. If at first the first-mentioned adjustment is undertaken and thereupon the last-mentioned adjustment is made, then the adjustment of the caster which occurs during the first adjustment, can be compensated again without difficulty by the second adjustment or can be adjusted to the desired value whereas with the second-mentioned adjustment the camber of the wheel does not practically change any more.

The present invention further relates to a particularly simple construction of the eccentric adjustment mechanism and consists to a considerable further extent in that the eccentric elements are rotatably supported in the one of the parts to be connected, for example, in the guide member and are guided displaceably in the direction of adjustment in the other of the two parts, for example, in a bearing arranged at the vehicle superstructure. In a preferred construction of the present invention, the eccentric element consists, for that purpose, of at least one eccentric pin and of at least one eccentric disk which is eccentric to the eccentric pin, whereby the eccentric pin and the eccentric disk are guided in mutually perpendicular or approximately perpendicularly arranged guide means of the other of the two parts to be connected, for example, of the bearing arranged at the vehicle superstructure. The eccentric pin may be supported thereby in a longitudinal slot of one or two bearing brackets or bearing eyes and the eccentric disk or disks between two guide cheeks of the bearing brackets or bearing eyes extending perpendicularly or essentially perpendicularly to the longitudinal slot.

In order to enable an independent adjustment of the two eccentric elements of the fork-like guide member as well as also to enable the absorption of shocks; according to a further feature of the present invention, the eccentric element is connected with one of the two parts to be pivotally connected with each other, especially with the part rotatably supported on the same, for example, the guide member, by the interposition of rubber elements, especially rubber bushings.

Accordingly, it is an object of the present invention to provide a wheel suspension of the type described above which enables a simple adjustment of the camber and caster of the vehicle wheels while at the same time avoiding the aforementioned shortcomings and drawbacks encountered in the prior art constructions.

Another object of the present invention resides in an installation for the adjustment of the camber and caster of vehicle wheels which is relatively inexpensive, obviates the necessity for costly finishing and fitting operations to assure accurate fits and is also substantially insensitive to assembly inaccuracies as well as wear and tear.

A further object of the present invention resides in an installation for the adjustment of the camber and/or of the caster of vehicle wheels which greatly simplifies the adjusting operations as compared to those required heretofore.

Still a further object of the present invention resides in an installation for the adjustment of the camber and/or caster which not only makes it possible to adjust both the caster and camber with similar adjusting installations but also excels by great simplicity in the construction and adjustment itself.

Another object of the present invention resides in the provision of a construction of the eccentric adjusting mechanism for the aforementioned purposes which is as simple as possible in structure and in its adjustment.

These and other objects, features, and advantages of the present invention will become more obvious from the following description when taken in connection with the accompanying drawing which shows, for purposes of illustration only, one embodiment in accordance with the present invention, and wherein:

FIG. 1 is a plan view on a guide system of a wheel by means of two superposed guide members—with the upper guide member indicated only in dash and dot lines—and which includes an adjusting installation in accordance with the present invention for the lower guide member;

FIG. 2 is a cross-sectional view, on an enlarged scale, taken along line 2—2 of FIG. 1 and also taken along line 2—2 of FIG. 3; and FIGS. 3 and 4 are cross-sectional views taken along line 3—3 of FIG. 2 and illustrating two different adjustments of an eccentric element.

Referring now to the drawing wherein like reference numerals are used throughout the various views to designate like parts, and more particularly to FIG. 1, reference numeral 10 designates therein a part of the vehicle superstructure of any conventional construction. The steering pin or steering knuckle 13 together with the wheel carrier 13a of a steerable front wheel is suspended at the vehicle superstructure 10 of a motor vehicle by means of a lower guide member 11 and an upper guide member 12 indicated in dash and dot lines. The lower guide member 11 thereby pivots about a horizontal, or possibly also about an inclined axis $a$—$a$ (FIG. 1) while the upper guide member 12 pivots about a horizontal or also about a possibly inclined axis $b$—$b$ whereby both pivot axes $a$—$a$ and $b$—$b$ either extend parallel to the driving direction $f$ or, as illustrated, for example, in FIG. 1, and viewed in plan view, form each a predetermined angle to the driving direction $f$. The wheel, i.e., the steering pin 13 or the wheel carrier 13a is thereby guided by the two guide elements 11 and 12 in the manner of a guide quadrangle whereby the joint connecting the guide member 11 with the steering pin 13 or with the wheel carrier 13a is designated in FIG. 1 by reference numeral 13b. The wheel spring system 15, of any conventional construction, is supported appropriately in any known manner, on the one hand, against the lower guide member 11 and, on the other, against the vehicle superstructure 10.

The lower guide member 11 is of fork-shape construction whereby its fork arms 16 and 17 are pivotally supported about the pivot $a$—$a$ of the guide member 11 in bearing supports, for example, in bearing brackets 18 and 19 with bearing arms 18a and 19a, respectively. The bearing brackets 18 and 19 are rigidly connected with the vehicle superstructure 10 for example, are welded or threadedly secured thereto, and are provided at the bearing arms thereof, as indicated in detail in FIGS. 2 to 4, for example, for the bearing brackets 18, with parallel guide means, e.g., in the form of guide cheeks 20, between which are guided the eccentric disks 21 of eccentric elements consisting of the eccentric disks 21 and of eccentric bolts 22. The eccentric disks 21 are non-rotatably connected with the eccentric bolts 22 in that, for example, a key or nose portion 23, made in one piece with the eccentric disk 21 or inserted into the same, engages into a corresponding key groove 24 of the eccentric pin 22.

Furthermore, horizontal slots 25 are provided in the bearing arm 18a and 19a of the bearing brackets 18 and 19, through which extend the eccentric bolts 22 in such a manner that upon rotation of the eccentric disks 21, the eccentric bolts 22 are able to carry out a horizontal to and fro movement in the slots 25. Furthermore, yielding rubber or synthetic plastic bushings 27 are arranged in the bearing eyes 26 of the fork arm 16 and 17 of the guide member 11 which, in their turn, surround the bearing bushings 29—by the interposition, of example, of metallic bushings 28 adheringly connected with the bushings 27. During the assembly of the guide member 11 at first the bushings 27, 28 and 29 are inserted into the bearing eye 26 from opposite sides, thereupon the guide member is introduced with the fork arm 16 or 17 between the two bearing arms 18a of the bearing bracket 18 and thereafter under the interposition of the eccentric disks 21, the eccentric bolt 22 is inserted through the slots 25 of the bearing arms 18a and the bearing bushings 29 and finally the bearing bolt 22 is axially secured by means of its head 30 and its nut 31. The eccentric disks 21 are thereby securely pressed against the bearing eyes 18a and are fastened thereby by means of the clamping effect.

As can be seen, the eccentric elements 21, 22 are determined in relation to the vehicle superstructure or the bearing arms 18a in a horizontal transverse direction of the vehicle by the guide means 20 and in the vertical direction by the walls of the slots 25. By rotation of the eccentric bolt 22 together with the eccentric disks 21 which is possible after loosening the nut 31, the eccentric bolt 22, as can be seen, for example, from FIGS. 3 and 4, can be adjusted transversely to the driving direction in relation to the vehicle superstructure. The eccentric disk 21 is in FIG. 3 in such a position that the eccentric bolt 22 assumes a relative outer position, i.e., an adjusted position in the direction toward the associated vehicle wheel. The distance A between the vertical center plane $m$—$m$ of the eccentric elements 21, 22 and therewith of the bearing bracket 18 from the joint 13b connecting the lower guide member 11 with the steering pin 13 or with the wheel carrier 13a is thereby a maximum.

If the eccentric disks 21 are rotated through 90°, as is indicated in FIG. 4, then the eccentric bolt 22 is adjusted in the slots 25 transversely to the driving direction whereby the eccentric bolt 22 assumes a central position in the vertical center plane $m$—$m$ within the slots 25 and the distance A receives a medium value. A further rotation of the eccentric disks 21 by 90° would bring the eccentric bolt 22 into its right end position within the slots 25, as is indicated in FIG. 3 by reference numeral 22′. The distance A (FIG. 1) between the joint 13b near the wheel of the lower guide member (in the position 11′ thereof) and the vertical center plane $m$—$m$ of the eccentric disks 21 and therewith of the bearing brackets 18 and 19 is, in this case, a minimum in that the joint 13b of the guide member 11 near the wheel is moved closer to the vertical vehicle longitudinal plane by an amount 2e double the eccentricity e of the eccentric bolt 22 to the eccentric disks 21.

An adjustment of the eccentric disks 21 or of the eccentric bolts 22 in the bearing brackets 18 and 19 (FIG. 1) has the following effect on the wheel adjustment:

It is assumed that at first the eccentric disks 21 between the bearing arm 16 of the guide member 11 and the bearing bracket 18 are adjusted. The bearing point X at the fork arm 17 of the guide member 11 thereby acts as point of rotation so that the joint 13b near the wheel pivots about the point X in the direction of arrow $x$. A component of this movement $x$, which is the larger the closer the point X is disposed to the wheel 14 or the further it is located remote from the wheel center plane in the vehicle longitudinal direction, effects that the joint 13b comes closer to the vehicle superstructure 10 whereas the upper joint, which connects the upper guide member 12 with the wheel carrier or with the steering pin, remains unchanged. As a result thereof, the camber of the wheel 14 may be changed to the desired value. However, simultaneously therewith, the joint 13b also carries out a movement component in the driving direction $f$ (or in the opposite direction) whereby the caster of the wheel is also changed.

If an eccentric adjustment takes place at the fork arm 17 of the guide member 11 between the fork arms 17 and the bearing bracket 19, i.e., at the bearing point X, then the bearing point Y at the fork arm 16, on the other, acts as point of rotation so that the joint 13b of the guide member 11 near the wheel moves about the point Y in the direction of arrow $y$. Since the point Y is disposed in the same or essentially the same vertical vehicle transverse plane $q$—$q$ as the joint 13$b$, the movement $y$ represents in practice a movement in the driving direction $f$ (or in an opposite direction) without the occurrence of a substantial movement component transversely to the driving direction. Consequently, by the eccentric adjustment in the point Y, the desired caster (positive or negative) can be adjusted whereby also the change in caster, previously caused by the movement $x$ and dependent on the camber adjustment, is compensated.

While I have shown and described only one embodiment in accordance with the present invention, it is obvious that the same is not limited thereto but is susceptible of numerous changes and modifications as known to a person skilled in the art. Thus, the wheel, instead of being guided by two superposed transverse guide members, may also be guided, for example, by only one adjustable cross member in conjunction with a vertical guidance of the steering pin or wheel carrier.

Furthermore, the type of the eccentric adjustment illustrated in FIGS. 2 to 4, can also be used for other adjusting purposes independently of the combined adjustment of camber and caster. Thus, it is obvious that the present invention is not limited to the details shown and described herein but is susceptible of numerous changes and modifications, and I therefore do not wish to be limited to the details shown and described but intend to cover all such changes and modifications as are encompassed by the scope of the present invention.

I claim:

1. An installation for the adjustment of the camber and caster of wheels suspended at the vehicle superstructure by guide means, especially of steerable front wheels of motor vehicles guided by two superposed guide means, by the use of eccentric means arranged in the bearing joints of the guide means, wherein the improvement comprises guide means of approximately fork-like construction and including two fork arms, support means for supporting said two fork arms at the vehicle superstructure independently of one another by adjustable eccentric means in such a manner that one fork arm is supported at the vehicle superstructure at least approximately in the vehicle transverse plane containing the wheel center axis and the other in a plane displaced with respect thereto in the vehicle longitudinal direction, and said other fork arm supported at the vehicle superstructure closer to the wheel plane than the one fork arm, wherein the eccentric means are rotatably supported in one of the parts to be connected with each other and are displaceably guided in the adjusting direction in the other of the two parts to be connected with each other.

2. An installation according to claim 1, wherein said one part is a guide means.

3. An installation according to claim 2, wherein the other part is a bearing support arranged at the vehicle superstructure.

4. An installation according to claim 1, wherein the other part is a bearing support arranged at the vehicle superstructure.

5. An installation according to claim 1, wherein the eccentric means includes at least one eccentric bolt and at least one eccentric disk means eccentric to said bolt, said eccentric bolt and eccentric disk means being guided in at least approximately mutually perpendicular guide means in the other of the two parts to be connected.

6. An installation according to claim 5, wherein said support means includes bearing bracket means, the eccentric bolt being supported in a longitudinal slot provided in the bearing bracket means, and the eccentric disk means being guided between two guide cheek means provided in the bearing bracket means and extending essentially perpendicularly to the longitudinal slot.

7. An installation according to claim 6, wherein two eccentric disk means are arranged at the ends of a respective eccentric bolt and are each axially inserted from the outside between guide cheek means of the bearing bracket means.

8. An installation according to claim 7, wherein of the two eccentric disk means arranged at the end of the eccentric bolt, one is non-detachably connected with the eccentric bolt and the other is detachably and non-rotatably connected with the eccentric bolt.

9. An installation according to claim 8, wherein the eccentric means is connected with one of the two parts to be pivotally connected by the interposition of yielding means.

10. An installation according to claim 9, wherein said yielding means are elastic bushings.

11. An installation according to claim 10, wherein the last-mentioned one part of the parts to be connected is the guide means.

12. An installation according to claim 11, wherein the guide means is rotatably supported on the eccentric bolt connecting two eccentric disk means by way of at least one elastic bushing means, and wherein the eccentric bolt and eccentric disk means are guided in mutually, approximately perpendicular guide means in an axially outer bearing arm of a bearing bracket means arranged at the vehicle superstructure.

13. An installation for the adjustment of the camber and caster of wheels suspended at the vehicle superstructure by guide means, especially of steerable front wheels of motor vehicles guided by two superposed guide means, by the use of eccentric means arranged in the bearing joints of the guide means, wherein the improvement comprises guide means of approximately fork-like construction and including two fork arms, and support means for supporting said two fork arms at the vehicle superstructure independently of one another by adjustable eccentric means in such a manner that one fork arm is supported at the vehicle superstructure at least approximately in the vehicle transverse plane containing the wheel center axis and the other in a plane displaced with respect thereto in the vehicle longitudinal direction, wherein the eccentric means are rotatably supported in one of the parts to be connected with each other and are displaceably guided in the adjusting direction in the other of the two parts to be connected with each other.

14. An installation according to claim 13, wherein the eccentric means includes at least one eccentric bolt and at least one eccentric disk means eccentric to said bolt, said eccentric bolt and eccentric disk means being guided in at least approximately mutually perpendicular guide means in the other of the two parts to be connected.

15. An installation according to claim 14, wherein said support means includes bearing bracket means, the eccentric bolt being supported in a longitudinal slot provided in the bearing bracket means, and the eccentric disk means being guided between two guide cheek means provided in the bearing bracket means and extending essentially perpendicularly to the longitudinal slot.

16. An installation according to claim 15, wherein two eccentric disk means are arranged at the ends of a respective eccentric bolt and are each axially inserted from the outside between guide cheek means of the bearing bracket means.

17. An installation according to claim 15, wherein of the two eccentric disk means arranged at the end of the eccentric bolt, one is non-detachably connected with the eccentric bolt and the other is detachably and non-rotatably connected with the eccentric bolt.

18. An installation according to claim 15, wherein the eccentric means is connected with one of the two parts to be pivotally connected by the interposition of yielding means.

19. An installation according to claim 14, wherein the guide means is rotatably supported on the eccentric bolt connecting two eccentric disk means by way of at least one elastic bushing means, and wherein the eccentric bolt and eccentric disk means are guided in mutually, approximately perpendicular guide means in an axially outer bearing arm of a bearing bracket means arranged at the vehicle superstructure.

20. An installation for the wheel adjustment, especially for the adjustment of the camber and/or caster of wheels of motor vehicles suspended at the vehicle superstructure by means of guide members by the use of eccentric elements arranged in the joints of the guide members, wherein the improvement comprises means for rotatably supporting said eccentric elements in one of the parts to be connected with each other and means for displaceably guiding the eccentric elements in the adjusting direction in the other of the two parts wherein the displaceable guiding means includes slot means for imparting a translating motion to the eccentric elements relative to the other of the two parts during the rotation of the eccentric elements.

21. An installation according to claim 20, wherein said one part is a guide member.

22. An installation according to claim 21, wherein the other part is a bearing arranged at the vehicle superstructure.

23. An installation according to claim 20, wherein the eccentric element means includes at least an eccentric bolt and at least an eccentric disk eccentric to said bolt, said eccentric bolt and eccentric disk being guided in at least approximately mutually perpendicular guide means of the other of the parts to be connected.

24. An installation according to claim 23, wherein said support means includes bearing bracket means, the eccentric bolt being supported in a longitudinal slot provided in the bearing bracket means, and the eccentric disk being guided in guide walls of the bearing bracket means extending essentially perpendicularly to the longitudinal slot.

25. An installation according to claim 23, wherein two eccentric disks are arranged at the ends of a respective eccentric bolt and are axially inserted from the outside between guide walls of the bearing bracket means.

26. An installation according to claim 23, wherein of the two eccentric disks arranged at the end of the eccentric bolt, one being non-detachably connected with the eccentric bolt and the other being detachably and non-rotatably connected with the eccentric bolt.

27. An installation according to claim 20, wherein the eccentric element is connected with one of the two parts to be pivotally connected by the interposition of elastic means.

28. An installation according to claim 27, wherein the last-mentioned part of the parts to be connected is a guide member.

29. An installation according to claim 20, wherein a guide member is rotatably supported on an eccentric bolt connecting two eccentric disks by way of at least one elastic bushing, and wherein the eccentric bolt and eccentric disks are guided in mutually, approximately perpendicular guide means provided in an axial outer bearing arm of a bearing bracket means arranged at the vehicle superstructure.

30. An installation for adjustment of a wheel, especially for the adjustment of the camber and caster of vehicle wheels suspended at the vehicle superstructure by means of at least one guide member by the use of eccentric element means arranged in a joint of the guide member, wherein the eccentric element means includes two portions being eccentric relative to each other, means for rotatably supporting one of the portions on one of the parts to be connected, and at least approximately perpendicular guiding means for the other of the portions on the other of the parts to be connected.

31. An installation according to claim 30, wherein the one of the parts is the guide member.

32. An installation according to claim 31, wherein the other of the parts is a bearing support arranged at the vehicle superstructure.

33. An installation according to claim 30, wherein the two portions include at least one eccentric bolt and at least one eccentric disk means eccentric to the bolt, the means for rotatably supporting one of the portions includes a bearing bracket means, the eccentric bolt being supported in a longitudinal slot provided in the bearing bracket means, and the eccentric disk means being guided between two guide cheek means provided in the bearing bracket means and extending essentially perpendicular to the longitudinal slot.

34. An installation according to claim 33, wherein two eccentric disk means are arranged at the ends of a respective eccentric bolt and are each axially inserted from the outside between guide cheek means of the bearing bracket means.

35. An installation according to claim 33, wherein of the two eccentric disk means arranged at the end of the eccentric bolt, one is non-detachably connected with the eccentric bolt and the other is detachably and non-rotatably connected with the eccentric bolt.

36. An installation according to claim 33, wherein the eccentric means is connected with one of the two parts to be pivotably connected by the interposition of yielding means.

37. An installation according to claim 30, wherein the guide member is rotatably supported on the eccentric bolt connecting two eccentric disk means by way of at least one elastic bushing means, and wherein the eccentric bolt and eccentric disk means are guided in the mutually, approximately perpendicular guiding means in an axially outer bearing arm of the bearing bracket means arranged at the vehicle superstructure.

References Cited

UNITED STATES PATENTS

| | | | |
|---|---|---|---|
| 2,890,062 | 6/1959 | Perkins | 280—96.2 |
| 2,890,893 | 6/1959 | Laukhuff | 280—96.2 |
| 3,124,370 | 3/1964 | Traugott | 280—96.2 |
| 3,237,962 | 3/1966 | Kraus et al. | 280—96.2 |
| 3,257,121 | 6/1966 | Muller | 280—96.2 |
| 3,273,910 | 9/1966 | Willingshofer et al. | 280—96.2 |
| 3,357,661 | 12/1967 | Aakjar | 280—96.2 X |

KENNETH H. BETTS, Primary Examiner

U.S. Cl. X.R.

287—93, 100